Jan. 28, 1958   K. A. SCHMULDT   2,820,983
ASSEMBLY FIXTURE FOR POINT CONTACT DEVICE
Filed May 7, 1953
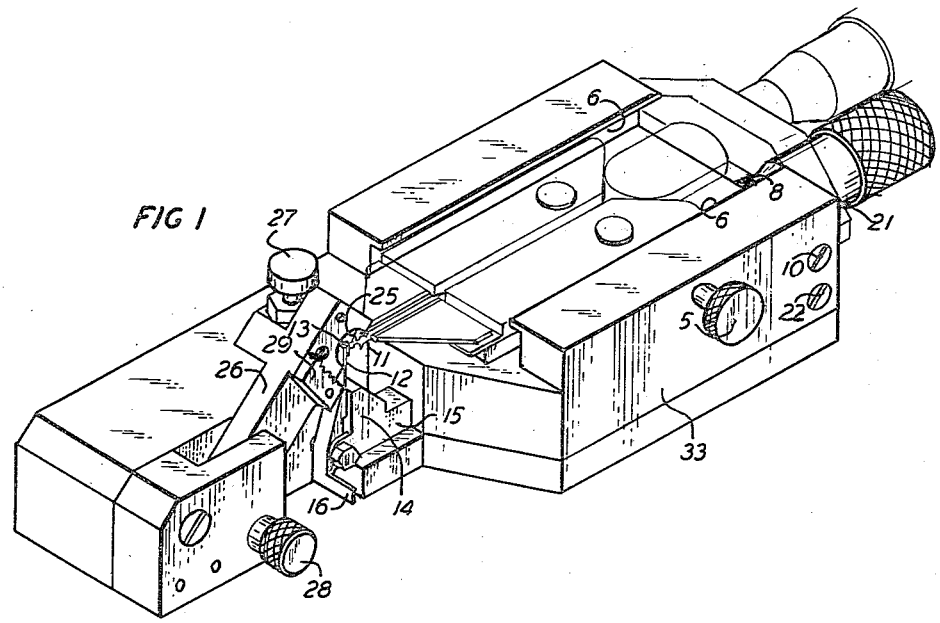
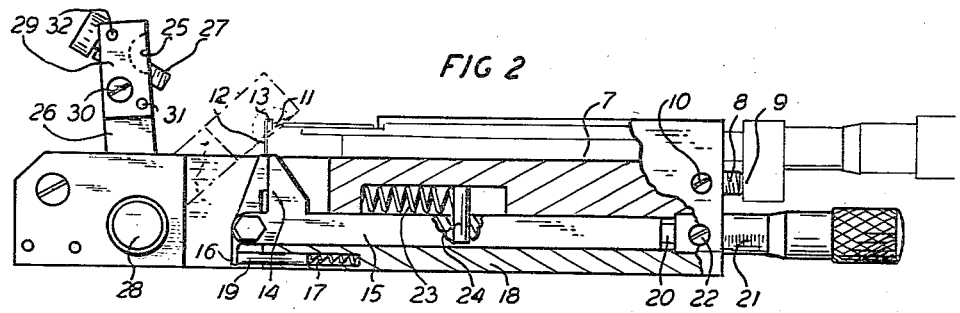
INVENTOR
K. A. SCHMULDT
BY
W. C. Parnell
ATTORNEY 2,820,983

ASSEMBLY FIXTURE FOR POINT CONTACT DEVICE

Karl A. Schmuldt, Emmaus, Pa., assignor to Western Electric Company, Incorporated, New York, N. Y., a corporation of New York Application May 7, 1953, Serial No. 353,507

3 Claims. (Cl. 18—1)

This invention relates to an assembly fixture and particularly to a fixture for assembling point contact devices such as transistors.

In the manufacture of transistors of the point contact type, the processed contact wires which are secured in a wire holder must be brought into pressure contact with a semi-conductor wafer and while held under pressure, the assembled unit must be incapsulated with a casting resin.

The object of this invention is to provide a fixture with which these units may be assembled quickly and accurately to produce a uniform product.

In general, the fixture comprises a main body member having ways for receiving the wire holder, jaws for supporting the semi-conductor wafer, means for obtaining accurately controlled pressure contact between the ends of the wires and the wafer and a mold member which may be filled with resin and moved into molding position where the wafer and the point contacts of the adjusted wires are submerged in the resin within the mold cavity.

These and other features of the invention will be more fully understood from the following detailed description when considered in conjunction with the accompanying drawing in which:

Fig. 1 is a partially broken, isometric view of a fixture according to the invention; and Fig. 2 is a side elevational view, partially in section, of the device of Fig. 1.

Referring now to the drawing, the fixture has a main body member 33 which is provided with a pair of parallel ways 6 for receiving a wire holder 7 of the type disclosed in applicant's Patent No. 2,688,267 issued on September 7, 1954 in class 81, subclass 3. An adjustable stop member 8, secured in its adjusted position by set screw 10, is provided for engaging a corresponding stop member 9 on the wire holder to position the holder so that the contact wires 11 projecting therefrom will be in the proper work area. A locking screw 5 is provided to secure the holder 7 in its proper position in the ways.

The base member 12 having a semi-conductor wafer 13 mounted thereon, is held between the jaws 14 of the base holder 15. The pivoted member of the jaw 14 is spring-loaded by the pin 19 of the compressed spring mechanism 17 which is housed in the plate 18 mounted on the bottom of the main body member 33. An extension 16 is provided on the pivoted jaw member to facilitate spreading the jaws for the insertion of the base member therein.

The base member holder 15 is slidably mounted in a guideway in the main body member 33 and is positioned therein by micrometer screw 20 which engages the end thereof, the stationary sleeve 21 of the micrometer being secured at the end of the main body member by the set screw 22. The base holder 15 is held in pressure contact against the micrometer screw by the action of the compressed spring 23, housed in a recess in the main body, against the pin 24 which is fixed to the base holder.

An open mold 25, shown in the broken view of Fig. 1, for the incapsulating resin is of a general semi-circular construction and is contained in the pivotally mounted arm 26. This arm is held in the position shown in Fig. 2, except for the actual incapsulation operation when it is moved to the position shown in phantom. A stop 27 is provided on the arm to locate the mold in proper position for incapsulation of the wafer and the contact wires. The lock screw 28 holds the arm in either of the fixed positions. The mold 25, which is held in assembled position by the screw 30 and dowels 31 and 32, has a side member 29 which may be removed, if necessary, in order to take out the completed incapsulated transistor. For incapsulation, the fixture must be externally supported so that the open side of the hold is facing upward.

In operation, the base member is inserted in the jaws of the base holder, the wire holder is locked in place in the ways of the main body against the stop provided therefor, and the base holder micrometer adjustment is made to give the required pressure contact of the wires on the wafer. The mold is filled with the casting resin and then rotated and locked in position to submerge the wafer and the point contacts in the resin within the mold cavity. The fixture is then positioned in an oven, in a support which holds the fixture in a position such that the open side of the mold faces upward, wherein the resin sets and hardens.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A fixture, for assembling point contact transistors in which the points of formed contact wires are held in pressure contact with a semi-conductor wafer mounted on a rigid member by a bead of resin molded around the wafer and the formed wires, the fixture comprising a main body portion having means for receiving and positioning a holder carrying formed contact wires projecting therefrom, jaws for supporting the rigid member with the wafer aligned with the points of the wires, means for producing accurately controlled pressure between the points and the wafer and a member having a mold cavity pivotally mounted on the body portion and movable from a loading position, where encapsulating material may be inserted in the mold, to a molding position where the wafer and the points are within the cavity of the mold and completely surrounded by encapsulating material therein.

2. A fixture for assembling a device having wires held in pressure contact with a body mounted on a rigid member by a bead of resin molded around the body and the wires in contact therewith, the fixture comprising a main body portion having means for receiving and positioning a holder carrying wires projecting therefrom, jaws for supporting the rigid member with the body aligned with the ends of the projecting wires, means for producing accurately controlled pressure between the said ends of the wires and the body and a member having a mold cavity pivotally mounted on the body portion and movable from a loading position where encapsulating material may be inserted in the mold, to a molding position where the body and the said ends of the wires are within the cavity of the mold and completely surrounded by encapsulating material therein.

3. A fixture, for assembling point contact transistors in which the points of formed contact wires are held in pressure contact with a semi-conductor wafer mounted on a rigid member by a bead of resin molded around the wafer and the formed wired, the fixture comprising a main body portion having means for supporting in fixed position a holder carrying formed contact wires projecting therefrom, movable jaws for supporting the rigid member with the wafer aligned with the points of the wires, means including a micrometer screw mechanism for adjusting the movable jaws for producing accurately controlled pressure contact between the points and the wafer, a member having a mold cavity pivotally mounted on the body portion and movable from a loading position, where encapsulating material may be inserted in the mold, to a molding position, and a stop for the mold cavity member for accurately positioning the member in the molding position such that the wafer and points are within the cavity of the mold and completely surrounded by encapsulating material therein.

References Cited in the file of this patent

UNITED STATES PATENTS

| | | |
|---|---|---|
| 1,248,593 | Arnold | Dec. 4, 1917 |
| 2,215,066 | Clark | Sept. 17, 1940 |
| 2,332,856 | Kalajian | Oct. 26, 1943 |
| 2,347,397 | Crist et al. | Apr. 25, 1944 |
| 2,494,747 | Fermanian | Jan. 10, 1950 |
| 2,685,107 | Schultz | Aug. 3, 1953 |
| 2,688,110 | Domaleski et al. | Aug. 31, 1954 |
| 2,741,069 | Wohlman | Apr. 10, 1956 |
| 2,748,326 | Ingraham | May 29, 1956 |

OTHER REFERENCES

Ser. No. 285,944, Swarovski (A. P. C.), published Apr. 27, 1943.